US012604907B2

(12) United States Patent
Valente

(10) Patent No.: US 12,604,907 B2
(45) Date of Patent: Apr. 21, 2026

(54) BAKERY PRODUCT READY FOR BAKING

(71) Applicant: SOREMARTEC S.A., Senningerberg (LU)

(72) Inventor: Antonio Valente, Turin (IT)

(73) Assignee: SOREMARTEC S.A., Senningerberg (LU)

( * ) Notice: Subject to any disclaimer, the term of this patent is extended or adjusted under 35 U.S.C. 154(b) by 630 days.

(21) Appl. No.: 17/602,521

(22) PCT Filed: Apr. 1, 2020

(86) PCT No.: PCT/IB2020/053081
§ 371 (c)(1),
(2) Date: Oct. 8, 2021

(87) PCT Pub. No.: WO2020/208478
PCT Pub. Date: Oct. 15, 2020

(65) Prior Publication Data
US 2022/0159976 A1 May 26, 2022

(30) Foreign Application Priority Data
Apr. 11, 2019 (LU) ........................................ 101 179

(51) Int. Cl.
*A21D 13/19* (2017.01)
*A21D 13/36* (2017.01)
(52) U.S. Cl.
CPC .............. *A21D 13/19* (2017.01); *A21D 13/36* (2017.01)
(58) Field of Classification Search
None
See application file for complete search history.

(56) References Cited

U.S. PATENT DOCUMENTS 6,024,995 A * 2/2000 Rosso ..................... A23G 3/545
426/138

FOREIGN PATENT DOCUMENTS

| | | | | | |
|---|---|---|---|---|---|
| EP | 0083324 | A2 | * | 7/1983 | ........... A23G 3/2023 |
| EP | 1388287 | A1 | | 2/2004 | |
| IT | 1129399 | B | * | 6/1986 | ............. A21C 15/04 |
| WO | 98/15188 | A2 | | 4/1998 | |
| WO | 9815188 | A1 | | 4/1998 | |
| WO | 00/59309 | A1 | | 10/2000 | |
| WO | 01/93687 | A1 | | 12/2001 | |
| WO | WO-2005034638 | A1 | * | 4/2005 | ......... A21D 13/0022 |
| WO | WO-2014001828 | A1 | * | 1/2014 | ............. A21C 9/065 |

OTHER PUBLICATIONS

Hezzi D's Recipe Box "Cadbury Egg Stuffed Croissants" 2015—16 pages (Year: 2015).*
Best Ferrero Rocher Stuffed Cupcake Recipe (Year: 2017).*
International Search Report and Written Opinion issued for International Application No. PCT/IB2020/053081 on May 26, 2020, 12 pages.
Search Report issued for Luxembourg Patent Application No. 101179 on Jun. 7, 2019, 10 pages.

* cited by examiner

*Primary Examiner* — Jyoti Chawla
(74) *Attorney, Agent, or Firm* — Rothwell, Figg, Ernst & Manbeck, P.C.

(57) ABSTRACT

A bakery foodstuff product (10), ready for baking, comprising at least one layer of dough (2) shaped so as to delimit an inner chamber (4), and a filling (8) contained within said inner chamber (4),
said product being characterised in that it comprises a casing (6) made of wafer which contains said filling (8) and is housed within said inner chamber (4).

9 Claims, 1 Drawing Sheet

BAKERY PRODUCT READY FOR BAKING

CROSS REFERENCE TO RELATED APPLICATION(S)

This application is a 35 U.S.C. 371 National Phase Entry Application from PCT/IB2020/053081 filed Apr. 1, 2020, which claims priority to Luxembourgian Application No. LU 101 179, filed Apr. 11, 2019. The entirety of the disclosures of the above-referenced applications are incorporated herein by reference.

The present invention relates to a bakery product ready for baking, for retailing or else distribution to businesses, such as bars, confectioner's shops, restaurants, etc.

In particular, the product described herein is of the type comprising at least one layer of dough shaped so as to delimit an inner chamber, and a filling contained within the chamber.

Products of this type are, for example, those of the category of viennoiseries, i.e., baked confectionery products such as croissants, pain au chocolat, etc.

The products in question, in the majority of cases, arrive in the individual businesses deep-frozen, and are subjected to subsequent baking only before being put on sale.

The present applicant has noted that the baking operation can in some cases damage the filling or alter its organoleptic properties.

In this context, the object of the present invention is to provide a bakery product of the type referred to, which will overcome the aforesaid drawbacks.

The above object is achieved via a product presenting the characteristics specified in claim 1.

The claims form an integral part of the technical teaching provided herein in relation to the invention.

Further characteristics and advantages of the invention will emerge clearly from the ensuing description with reference to the annexed drawings, which are provided purely by way of non-limiting example and in which.

Figure 2:
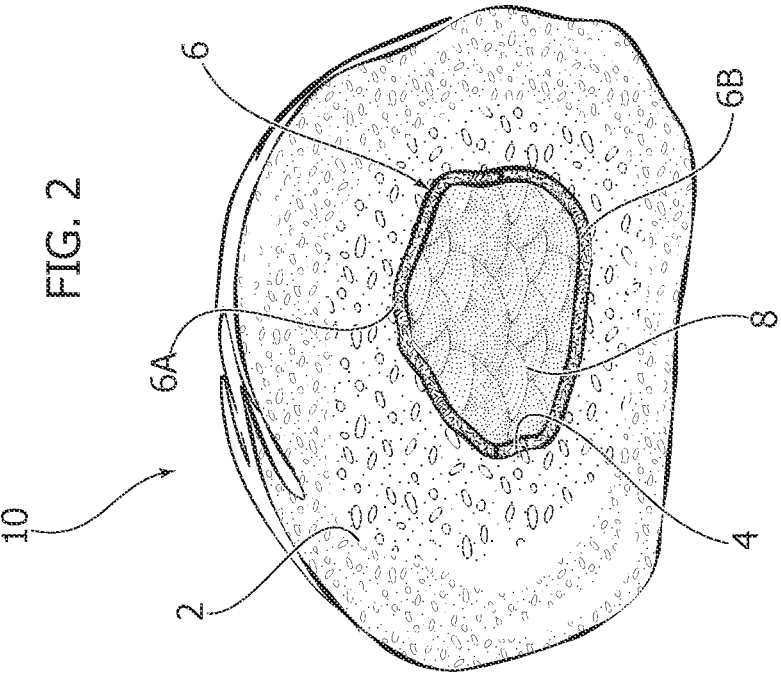
FIG. 2 is a cross-sectional view of the product of FIG. 1, sectioned according to the plane of section II-II.
Figure 1:
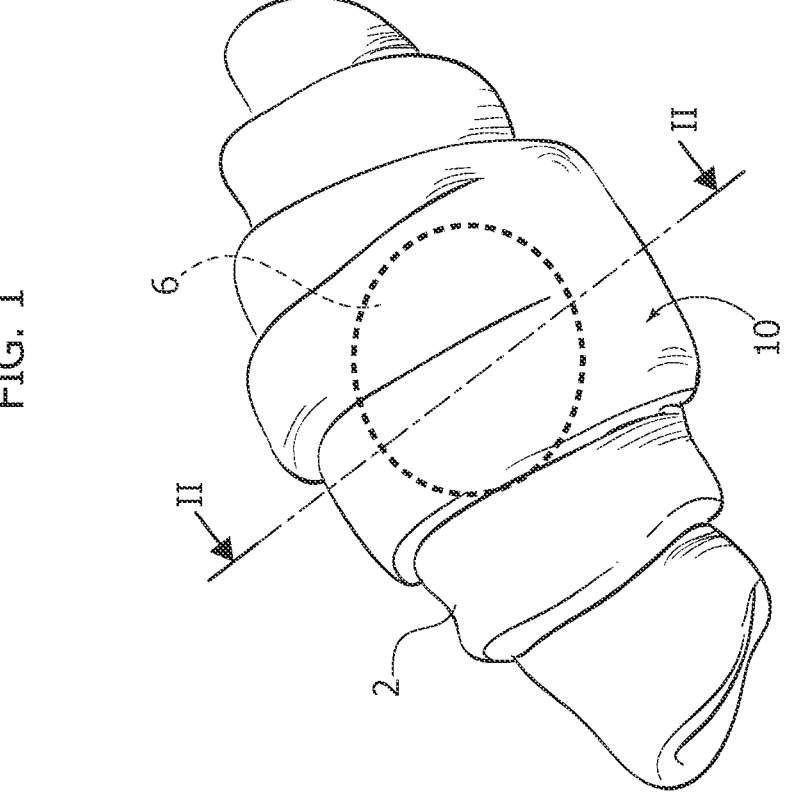
FIG. 1 illustrates an example of the product described herein.

In the ensuing description, various specific details are represented aimed at enabling an in-depth understanding of the embodiments. The embodiments may be provided without one or more of the specific details, or with other methods, components, or materials, etc. In other cases, known structures, materials, or operations are not illustrated or described in detail so that various aspects of the embodiment will not be obscured.

The references used herein are only provided for convenience and hence do not define the sphere of protection or the scope of the embodiments.

As anticipated above, the product described herein is a bakery product ready for baking, i.e., a bakery product already prepared in a final configuration thereof, but still to be baked for consumption. It can be presented as a deep-frozen or fresh product. Incidentally, it should be noted that the teachings that will be provided in what follows can be adopted indifferently for sweet or salty products.

In general, the product described herein comprises at least one layer of dough formed so as to delimit an inner chamber, and a filling contained within said chamber.

The product described herein is characterised in that it comprises a closed casing made of wafer which contains the filling and is housed within the aforesaid chamber.

The term "wafer" is used in the present description to define a sheet of any shape, resulting from forming and baking of a dough or batter for bakery products. This term is hence not to be understood as being in any way limiting as regards the nature of the ingredients used for the dough or batter; the "wafer" referred to may in fact be, for example, a wafer obtained from a conventional batter for making wafers or waffles, or else a wafer or waffle of bread obtained according to a leavening process.

The above wafer casing performs the function of protecting the filling, in particular in regard to the operation of baking that the product is to undergo before it can be consumed, so that the organoleptic properties of the filling will remain unaltered.

In this connection, the present Applicant has noted, first of all, that the wafer casing operates as a shield capable of thermally insulating the filling.

It should be noted that considered herein as baking processes are the common processes for baking bakery products, whether deep-frozen or not.

In the second place, the wafer casing constitutes to all effects a barrier that separates the filling from the layer of dough, this preventing, on the one hand, contamination of the filling by the moisture contained in the dough, or possibly by ingredients of the dough, and on the other hand migration of components of the filling towards the dough.

Surprisingly, the present Applicant has, however, noted that during the step of baking of the product the wafer casing absorbs a part of the moisture contained in the dough and undergoes softening.

This transformation of the wafer casing means that, at the moment when the product is to be consumed, the wafer casing is less perceptible by the consumer.

Consequently, use of the wafer casing enables protection of the filling in an effective way and without altering the organoleptic characteristics of the product.

Moreover, besides the functions of protection referred to, the wafer casing provides also the advantage of guaranteeing a precise positioning of the filling within the product and maintenance of the position.

Instead, in the solutions according to the prior art, since the filling is not withheld by any barrier, it can spread through the free gaps that it finds in the pastry of the product, thus being dispersed or even coming out of the product, above all in the case of creamy or liquid fillings.

In general, the bakery product described herein may be of any type, for example, a product of the category of viennoiseries.

The dough used may hence be obtained according to the common recipes known in the art for the various types of product. For instance, the dough may be a dough made in sheet form and then leavened, made up of wheat flour, butter, sugar, water, and yeast.

At the same time, it may be presented in the form of one or more layers shaped according to the modalities typical of the different types of product.

With reference to the wafer casing, this is preferably formed by a closed wafer shell, here to be understood as a completely hollow casing.

The wafer casing or shell may be obtained starting from a common dough or batter for the production of wafer or waffle products.

By way of example, the recipe for the dough may include the following ingredients (the amounts referred to are expressed in weight percentages with respect to the total weight of the dough):

wheat flour (42%-39%),
water (52-49%),
sugar (5%-10%),
milk (5%-10%),
oil (2%-4%),
soybean lecithin (<1%),
salt (<1%),
bicarbonate of soda (<1%).

The recipe for the dough may in any case be varied according to the type of bakery product to be obtained, so that the flavour of the waffle or of the wafer will always be calibrated on the flavour and taste of the other ingredients envisaged.

With reference now to the figures, these represent a filled croissant 10 obtained according to the teachings provided herein.

In a way in itself conventional, the croissant 10 is formed by a layer of dough 2 folded on itself. Once again in a way in itself known, this layer of dough may present a triangular profile—in the preparatory spread-out condition—so as to provide the typical cornet structure once it is folded on itself.

The folded layer 2 delimits an inner chamber 4, housed in which is a closed wafer shell 6 containing a filling 8.

It will in general be noted that the dimensions of the wafer shell depend upon the amount of filling envisaged. Preferably, the internal volume of the shell is completely filled with the filling. The shape of the shell may instead depend upon the type of bakery product to be obtained and in particular upon its specific conformation.

The thickness of the shell may be selected on the basis of the required insulating capacity, i.e., on the basis of the parameters of the baking step (for example, temperature and duration) envisaged for the product. Preferably, it is comprised between 1 mm and 2 mm, even more preferably between 1.60 mm and 1.90 mm.

Preferably, the wafer shell is constituted by two parts or pieces of wafer coupled together so as to form a closed shell.

In various embodiments, as in the one illustrated, the wafer shell 6 is constituted by two half-shells 6A, 6B coupled together at the respective mouth edges.

In alternative embodiments, the wafer shell is formed by a first piece of wafer shaped like an open container and by a second piece of wafer that closes the piece shaped like a container.

The filling may be of any type.

From the foregoing, the solution described herein is particularly advantageous for applications in which use of fillings that can undergo alterations of their organoleptic properties during baking of the product is envisaged.

In this connection, the present Applicant has been able to verify that through the solution described herein it is possible to provide bakery products, ready for baking, which have as filling the spreadable cream known on the market under the registered trademark Nutella®.

Up to now, in fact, the cream Nutella® has never been used as filling for products of the type in question on account of its delicate consistency that is not conducive to oven-baking. The same applies, more in general, for spreadable creams having the flavour of hazelnut and chocolate.

Using the teachings provided herein, the present Applicant has been able to verify that the wafer shell described is able to protect the cream Nutella® from possible alterations caused by oven-baking of the product. More in general, the present Applicant has found that for products containing the common anhydrous creams, possibly used in combination with moist products, the solution described herein affords a substantial improvement of the quality of the end product, with particular reference to its state after baking.

Of course, without prejudice to the principle of the invention, the details of construction and the embodiments may vary, even significantly, with respect to what is illustrated herein purely by way of non-limiting example, without thereby departing from the scope of the invention, as defined by the annexed claims.

The invention claimed is:

1. A bakery foodstuff product (10), ready for baking, comprising at least one layer of unbaked dough (2) delimiting an inner chamber (4) of said product (10), and a filling (8) contained within said inner chamber (4), said product further comprising a casing (6) constituted by a closed shell made of wafer which contains said filling (8) and is housed within said inner chamber (4), wherein said wafer thermally insulates said filling and forms a barrier between said filling and said; at least one layer of unbaked dough and is in contact with said filling and said at least one layer of; unbaked dough, and wherein said at least one layer of unbaked dough comprises a folded leavened sheet.

2. The product according to claim 1, wherein said wafer shell (6) is constituted by two pieces of wafer (6A, 6B) coupled together to form said shell.

3. The product according to claim 2, wherein said shell is formed by two half-shells (6A, 6B) coupled together at respective mouth edges.

4. The product according to claim 2, wherein said shell (6) is formed by a first piece of wafer shaped like an open container and by a second piece of wafer that closes said piece shaped like a container.

5. The product according to claim 1, wherein said wafer casing or shell (6) has walls having a thickness of between 1 mm and 2 mm, preferably between 1.60 mm and 1.90 mm.

6. The product according to claim 1, which belongs to one of the following types of bakery product: croissants and pain au chocolat.

7. The product according to claim 1, wherein said layer of dough (2) is folded on itself to form said inner chamber (4).

8. The product according to claim 1, wherein said layer of dough (2) is not wafer.

9. The product according to claim 1, wherein said inner chamber (4) is closed with respect to the outside of the product.

* * * * *